United States Patent Office 2,708,150
Patented May 10, 1955

2,708,150

PRINTING COMPOSITIONS CONTAINING THIOINDIGOID VAT DYES

Roy H. Kienle and Chester A. Amick, Bound Brook, N. J., assignors to American Cyanamid Company, New York, N. Y., a corporation of Maine No Drawing. Application May 31, 1952, Serial No. 291,060

8 Claims. (Cl. 8—70)

This invention relates to an improved thioindigoid vat dye printing paste.

The problem of strong prints of uniform color and sufficient utilization of the thioindigoid vat dye in printing pastes has been a serious one for many years. A number of assistants have been developed of various types; many of them, however, have left something to be desired in practical operation, because not only is it desirable to effect good transfer of the dye to the fabric to obtain strong color and uniform shade, but it is also desirable, to prevent drying out, to maintain a satisfactory viscosity of the color paste, and to improve the behavior of the paste when high temperature vat agers are used.

According to the present invention, it has been found that azoic dyes which have been metallized with a ferrous salt form a class of solid printing assistants which cause strong, smooth and bright prints to be obtained. These products are compatible with or are dispersible in aqueous color paste suspensions. They do not cause the printing color pastes to deteriorate on standing after they are prepared, and they result in good color yield even under hot aging conditions. These printing assistants may be incorporated into the color pastes as alcoholic suspensions and are particularly valuable in improving the printing strength of thioindigoid vat dyes.

The amount of printing assistant used is not critical. Minute amounts, less than 5% of the vat dyestuff, will not exert the full beneficial effects which can be obtained by the present invention. In general, amounts less than 50%, based on the weight of the vat dyestuffs, do not produce the improvements of the present invention to a point where a practical advantage results. Larger amounts of the printing assistant, however, improve the effectiveness of the paste, optimum results being obtained when the amount of printing assistant is approximately equal to that of the vat dyestuff. Larger amounts of our printing assistants do no particular harm, but as they do not improve results, there is no advantage in using an excess.

To prepare our printing assistants, any azoic dye may be metallized by refluxing with a soluble ferrous salt. The product is then thoroughly washed to remove any unreacted iron salt. The metallized pigment so obtained does not give any of the usual qualitative tests for electrovalent iron. The invention will be described in greater detail in conjunction with the following specific examples, parts being by weight except where otherwise specified.

*Example 1*

Pigment Scarlet (Color Index 216) was prepared by diazotizing anthranilic acid and coupling with R salt. This dye, 0.25 mole, was dissolved in 250 parts of water and heated slowly to 140–160° F. with stirring, after which 0.05 mole of hydrated sodium acetate was added. To this mixture 0.025 mole of ferrous sulfate was added and the heating and stirring continued at the boiling point for one-half hour. The metallized dye was salted out, filtered, and washed with dilute sodium chloride solution. The product was then air-dried.

Two hundred fifty (250) parts of presscake (26% solids) containing the dye, bis-2:1-naphthioindigo, was dispersed with the addition of two parts of the sodium salt of disulfodinaphthylmethane, using a high-speed stirrer. The dispersed presscake was then passed through a colloid mill having a clearance of 0.002 inch.

A printing thickener was prepared by thoroughly mixing 2000 parts of British gum with 5000 parts of water and then heating in a double boiler with continuous stirring until the slurry reached a temperature of 185° F. Heating was continued for 90 to 120 minutes. Four hundred fifty (450) parts of powdered potassium carbonate and 450 parts of powdered sodium carbonate were then added and stirred until dissolved. The source of heat was removed and stirring continued until the mix was approximately 150° F. at which time 700 parts of sodium sulfoxylate formaldehyde was added and stirred until solution was complete. After 600 parts of glycerine was added, the contents were bulked to 10,000 parts with water and stirring continued until the paste had cooled to approximately room temperature.

Six parts of the dispersed dye (1.6 parts of dye solids) was incorporated with 94 parts of printing thickener and after thorough stirring the printing paste so obtained was used as the control sample.

A second six parts of the dispersed dye was incorporated with 92.5 parts printing paste and 1.5 parts of the metallized printing assistant was added. Both printing pastes were applied to 80 x 80 bleached unmercerized cotton print cloth, after which the printed pieces were air-dried, aged in a steam ager, oxidized, soaped in a 0.1% soap solution at the boil, rinsed, and dried. The print from the paste containing the metallized dye was approximately 20% stronger than the print obtained from the control paste.

*Example 2*

The vat dye of Example 1 was colloidized by the procedure outlined in U. S. Patent Reissue No. 21,402, and 4.15 parts of the colloidized product, containing about 1.6 parts dye, was mixed with 96 parts of the print thickener prepared according to Example 1 above. The printing paste so obtained was used as a control.

A second printing paste was prepared, which was similar to this control except that it contained 1.5 parts of the printing assistant described in Example 1. These printing pastes were applied to cotton print cloth according to the procedure described in Example 1. In this instance, the paste containing the assistant tested approximately 25% stronger than the control sample.

*Example 3*

A printing thickener was prepared by thoroughly mixing 2100 parts of British gum, 200 parts of tapioca flour, 500 parts of cornstarch, and 2500 parts of cold water and heating in a double boiler with constant stirring at a temperature of approximately 185° F. for about 90–120 minutes. The source of heat was removed, the stirring continued and the mixture was cooled to a temperature of approximately 150° F. Twenty-one hundred (2100) parts of potassium carbonate dissolved in hot water was then added, followed by 1100 parts of sodium sulfoxylate formaldehyde and stirring continued to give a uniform paste. Finally, 1400 parts of glycerine was added and the contents bulked to 10,000 parts. Cooling and stirring was continued until the temperature was approximately that of the room.

Four parts of the colloidized dye of Example 2 containing about 1.6 parts of dye solids was mixed with 96 parts of the printing thickener described above. The resulting printing paste was divided into two equal portions; one portion was used as the control, and to the second portion was added 0.75 part of the printing assistant described in Example 1. Both printing pastes were applied to a titanium dioxide-pigmented viscose rayon. After finishing, the print obtained from the paste which contained the metallized pigment was approximately 15% stronger than the control. Both prints were in the steam ager for ten minutes. When time in the steam ager was reduced to five minutes, the print made with the printing assistant showed an even greater increase in strength over the control sample, indicating that the addition of the metallized pigment increased the rate at which satisfactory aging progressed.

*Example 4*

The procedure of Example 2 was repeated, substituting for the color of that example, an equal amount of 6,6'-dichloro-4,4'-dimethyl-bis thionaphthene indigo. When the prints were completed, the stripe made from the paste containing the metallized pigment was from 15% to 20% stronger than the control sample.

*Example 5*

The procedure of Example 1 was repeated, substituting for the color of that example a 50/50 mixture of the dispersed presscakes of the orange vat dye having C. I. 1217, and 6,6'-dichloro-4,4'-dimethyl-bis-thionaphthene indigo. Again, the print made in the presence of the metallized pigment was much brighter than the control print.

*Example 6*

The procedure of Example 2 was repeated, except that the vat dye of Example 2 was replaced by an equal weight of 5,5'-dichloro-7,7'-dimethyl-bis-thionaphthene indigo (Vat Violet 6R). The usual improvement resulting from the presence of the covalent iron pigment in the print paste was readily discernible.

We claim:

1. A vat dye paste suitable for incorporation into a printing paste, comprising a combination of at least one thioindigo vat dye and a metallized insoluble chelated azo pigment, in which said metal is covalent iron.

2. A composition according to claim 1 in which the amount of said metallized dye is from 50% to 100% of the vat dye present.

3. A vat dye printing paste comprising at least one thioindigoid vat dye, a metallized insoluble chelated azo pigment, said metal being covalent iron, a printing thickener comprising alkali and sufficient reducing agent to reduce the dyestuff to its leuco form.

4. A printing paste according to claim 3 in which the amount of metallized dye is from 50% to 100% of the vat dye present.

5. The vat dye printing paste of claim 4 in which said metallized dye is the ferrous salt of Pigment Scarlet (Color Index 216).

6. A vat dye printing paste according to claim 5 in which said thioindigoid vat dye is 5,5'-dichloro-7,7'-dimethyl-bis thionaphthene indigo.

7. A vat dye printing paste according to claim 5 in which said vat dye is bis-2:1-napthioindigo.

8. A vat dye printing paste according to claim 5 in which said vat dye is 6,6'-dichloro-4,4'-dimethyl-bis-thionaphthene indigo.

References Cited in the file of this patent

UNITED STATES PATENTS

| 1,945,484 | Hagenbocker | Jan. 30, 1934 |
| 2,327,405 | Davidson | Aug. 24, 1943 |
| 2,371,103 | Kienle | Mar. 6, 1945 |